(12) United States Patent
Vanderpol et al.

(10) Patent No.: US 8,843,739 B2
(45) Date of Patent: Sep. 23, 2014

(54) ANTI-TAMPER DEVICE, SYSTEM, METHOD, AND COMPUTER-READABLE MEDIUM

(71) Applicant: Lockheed Martin Corporation, Bethesda, MD (US)

(72) Inventors: Mathew L. Vanderpol, Papillion, NE (US); Kyle A. Borowski, Erie, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/633,289

(22) Filed: Oct. 2, 2012

(65) Prior Publication Data

US 2013/0268753 A1 Oct. 10, 2013

Related U.S. Application Data

(60) Provisional application No. 61/620,226, filed on Apr. 4, 2012.

(51) Int. Cl.
*H04L 29/06* (2006.01)
*G06F 11/30* (2006.01)

(52) U.S. Cl.
USPC ............................ 713/155; 713/191; 713/194

(58) Field of Classification Search
None
See application file for complete search history.

(56) References Cited

U.S. PATENT DOCUMENTS

| | | | | |
|---|---|---|---|---|
| 6,009,177 | A * | 12/1999 | Sudia | 713/191 |
| RE42,762 | E * | 9/2011 | Shin et al. | 713/159 |
| 2005/0240712 | A1* | 10/2005 | Klein | 710/313 |
| 2006/0101288 | A1* | 5/2006 | Smeets et al. | 713/194 |
| 2006/0253714 | A1* | 11/2006 | Ito | 713/194 |
| 2006/0288407 | A1* | 12/2006 | Naslund et al. | 726/9 |
| 2007/0026942 | A1* | 2/2007 | Kinsley et al. | 463/29 |
| 2008/0240447 | A1* | 10/2008 | Zhu et al. | 380/279 |
| 2010/0031059 | A1* | 2/2010 | Laackmann et al. | 713/193 |
| 2010/0058431 | A1 | 3/2010 | McCorkendale et al. | |
| 2011/0055904 | A1* | 3/2011 | Tsutsumi | 726/4 |
| 2012/0165094 | A1 | 6/2012 | Kinsley et al. | |
| 2013/0046988 | A1* | 2/2013 | Saldhana | 713/175 |

FOREIGN PATENT DOCUMENTS

| | | | |
|---|---|---|---|
| EP | 2 164 016 A1 | 3/2010 | |
| WO | WO 2009/061523 A1 | 5/2009 | |
| WO | WO 2009061523 A1 * | 5/2009 | H04L 29/06 |

OTHER PUBLICATIONS

International Search Report and Written Opinion issued Jul. 22, 2013 in PCT/US2013/035111 filed Apr. 3, 2013.

* cited by examiner

*Primary Examiner* — Shin-Hon Chen
*Assistant Examiner* — Trang Doan
(74) *Attorney, Agent, or Firm* — Oblon, Spivak, McClelland, Maier & Neustadt, L.L.P.

(57) ABSTRACT

An anti-tamper hardware security device that communicates with a host machine, including a host interface coupled to the host machine and configured to receive an access request from the host machine, the access request being associated with an application; a key manager configured to manage cryptographic keys; a whitelist manager configured to manage application validation information; and a controller configured to receive the access request from the host interface, validate the application using the application validation information, retrieve a cryptographic key associated with the application, and transmit a response to the host machine through the host interface if the controller determines that the application is valid.

18 Claims, 9 Drawing Sheets

ANTI-TAMPER DEVICE, SYSTEM, METHOD, AND COMPUTER-READABLE MEDIUM

BACKGROUND

Cyber security is a major concern in information technology. As backend information systems become more advanced and complex, attackers have become more sophisticated in discovering and attacking newfound vulnerabilities in networks, storage systems, authentication systems, data processing systems, and the like. An attacker on a network typically initiates an attack by gathering information such as software and/or hardware information regarding a target device. Based on the gathered information, the attacker can determine weaknesses of the device, and further determines an intrusion technique to use the weakness to gain unauthorized access to the device. Robust cyber security is required to defend a system from attacks, prevent damage to information in the system, and ensure uninterrupted and secure information service from the system.

SUMMARY

An embodiment provides for an anti-tamper hardware security device that communicates with a host machine, including a host interface coupled to the host machine and configured to receive an access request from the host machine, the access request being associated with an application; a key manager configured to manage cryptographic keys; a whitelist manager configured to manage application validation information; and a controller configured to receive the access request from the host interface, validate the application using the application validation information, retrieve a cryptographic key associated with the application, and transmit a response to the host machine through the host interface if the controller determines that the application is valid.

The device can be configured to physically couple directly to the host machine.

The response can include at least one of an authorization message for the host machine to install the application and the cryptographic key associated with the application that enables the host machine to decrypt the application.

The response can include at least one of an authorization message for the host machine to install the application, the cryptographic key associated with the application that enables the host machine to decrypt the application, and a validated application executable on the host machine.

The anti-tamper hardware security device may further include a memory configured to store cryptographic keys and application validation information.

The controller can further be configured to decrypt the application using the cryptographic key associated with the application and execute the application in the memory after validating the application. The response can include at least one of an authorization message for the host machine to install the application, the cryptographic key associated with the application that enables the host machine to decrypt the application, a validated application executable on the host machine, and a result of an execution of the application by the controller in the memory.

The application validation information can include validated hash information corresponding to a valid application, and can be generated by the whitelist manager.

The cryptographic keys can be unique to the host machine, such that the cryptographic keys can only be used to decrypt applications for installation on the host machine.

The anti-tamper hardware security device can further include a network interface coupled to a network and configured to receive application information. The network interface can be further configured to receive an access request associated with the host machine and the application from the network, and the controller can be further configured to receive the access request associated with the host machine and the application from the network interface.

In another embodiment, an anti-tamper system includes the anti-tamper hardware security device of claim 1, and an application management server configured to manage the application (for example, the application to be installed) and communicate with the host machine. Alternatively, or in addition, the application management server can be configured to manage the application and communicate with the anti-tamper hardware security device.

The application management server can store synchronized copies of the cryptographic key, the application validation information, and the application.

Another embodiment provides for a method of securing an application management system including: receiving access requests from a host machine, the access request being associated with an application; validating the application using application validation information; and decrypting the application with a cryptographic key; and transmitting a response to the host machine, wherein the response includes at least one of an authorization message for the host machine to install the application, the cryptographic key associated with the application that enables the host machine to decrypt the application, a validated application executable on the host machine, and a result of an execution of the application by the controller in a memory.

Another embodiment provides for a non-transitory computer-readable storage medium storing a program executable by a hardware processor including: a reception unit configured to receive access requests from a host machine, the access request being associated with an application; a validation unit configured to validate the application using application validation information; a decryption unit configured to decrypt the application with a cryptographic key; and a transmission unit configured to transmit a response to the host machine, wherein the response includes at least one of an authorization message for the host machine to install the application, the cryptographic key associated with the application that enables the host machine to decrypt the application, a validated application executable on the host machine, and a result of an execution of the application by the controller in a memory.

BRIEF DESCRIPTION OF THE DRAWINGS

Various exemplary embodiments of a battery manufacturing process to which aspects of the invention are applied will be described in detail with reference to the following drawings in which.

DETAILED DESCRIPTION OF THE EMBODIMENTS

Embodiments of the invention are described below with reference to FIGS. 1-9.

Figure 1:
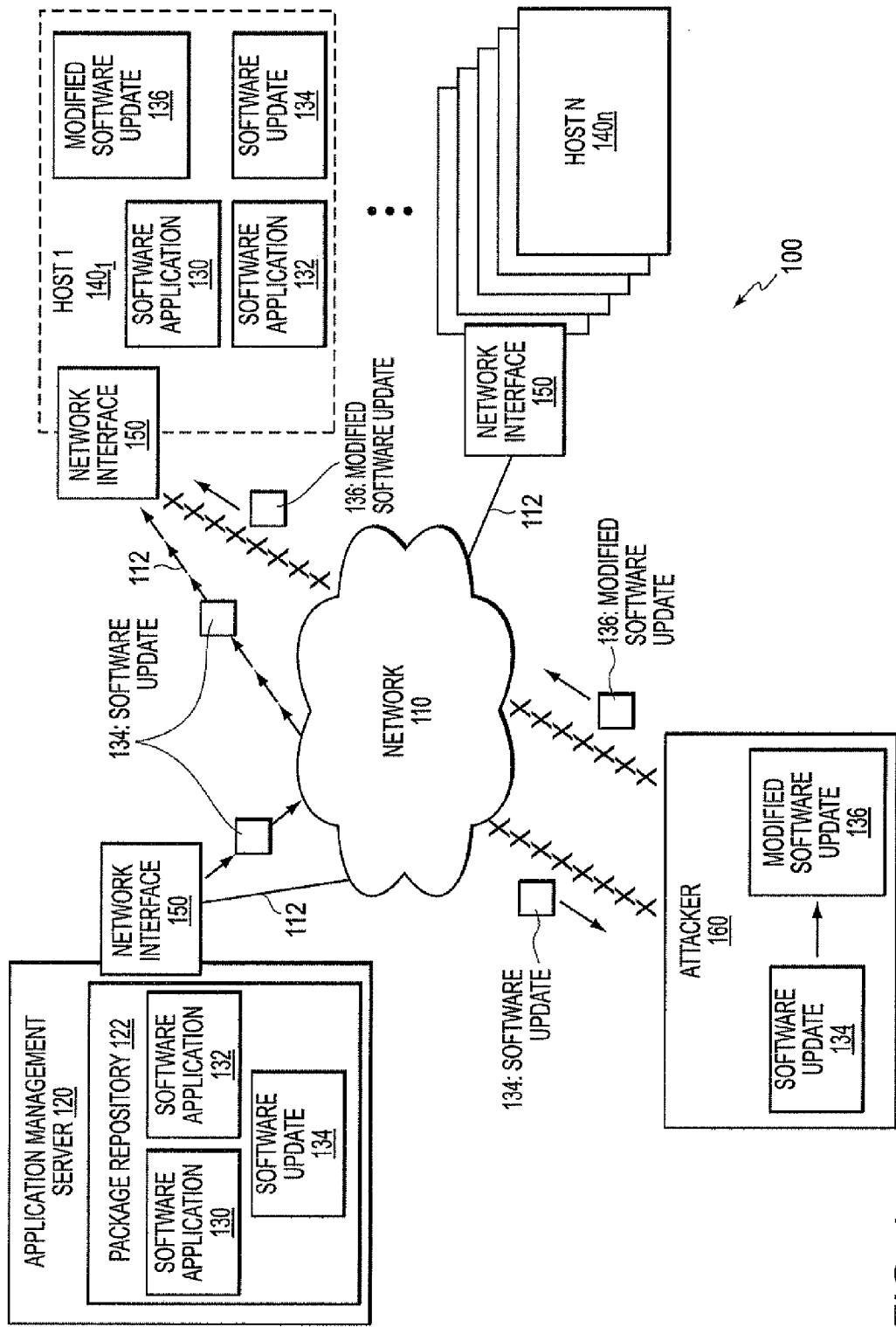
FIG. 1 shows a block diagram of an application management system subject to an attack.

FIG. 1 shows an exemplary block diagram of an application management system 100. The application management system 100 can include an application management server 120 and one or more hosts 140(1)-140(n). Periodically, the application management system 100 can also include an attacker 160. As shown, the application management server 120, one or more hosts 140(1)-140(n), and the attacker 160 can be coupled to each other via a combination of communication links 112 and a network 110.

The application management system 100 can be deployed within an information technology (IT) infrastructure to manage data, such as software applications, across a plurality of hosts 1401 to 140n. For example, the application management system 100 can manage any kind of software applications including, enterprise application software, retail software, mobile software, and the like. The data can also include non-application data such as enterprise content, forms, e-mail, web content, database data, documents, and the like. For purposes of this description, the application management system 100 will primarily manage software applications.

Software applications can be deployed on hosts 140(1)-140(n), meaning that a host 140(1)-140(n) can be assigned to run a software application. As shown in FIG. 1, the host 1401 runs at least two software applications, e.g., 130, 132, but it should be understood that the host 1401 can run any number of software applications. The hosts 140(1)-140(n) can be a single device, such as a computer, or it can be a plurality of devices or computers of the same or different types. For example, hosts 140(1)-140(n) can be datacenters, server clusters, application servers, database servers, monitoring devices, user workstations, cellular phones, personal digital assistants, telephones, and any other devices or combinations therein that communicate with other devices through a network 110. For ease of discussion, it will be assumed that the hosts 140(1)-140(n) are application servers.

The network 110 can be a single network or a plurality of networks of the same or different types and uses any number of suitable techniques supporting communication between two devices. For example, the network 110 can include a local telephone network in connection with a long distance telephone network. In another example, the network 110 can be a data network or a telecommunications or video distribution (e.g., cable, terrestrial broadcast, or satellite) network in connection with a data network. Any combination of telecommunications, video/audio distribution and data networks, whether a global, national, regional, wide-area, local area, or in-home network, can define the network 110. For discussion purposes, it will be assumed that the network 110 is a single integrated data network that is wired and/or wireless.

The hosts 140(1)-140(n) communicate to other hosts 140(1)-140(n) via the network 110 through one or more network interfaces 150. The network interfaces 150 provide interfaces for hosts 140 to connect to the network 110. The network interfaces 150 can include any suitable network interface module or controller, such as a network interface card, network adapter, and any other module that can suitably couple the hosts 140(1)-140(n) to the network 110 via any suitable communication link 112, such as a direct serial/parallel connection, cellular telephone link, RF and/or IR link, satellite communication link, fiber optical cable, CAT-5, and other communication links 112 for network communication.

Any host 140(1)-140(n) can include its own networks entirely contained within the host. For example, a host 140(1)-140(n) can be a datacenter with multiple application servers where the datacenter has one or more internal local area networks. In another example, a host 140(1)-140(n) can be a database server with an internal network of memory, such as hard disk drives.

In the application management system 100, hosts 140(1)-140(n) acting as application servers can communicate with an application management server 120 through the network 110. The application management server 120 is a host that is connected to the network 110 through one or more network interfaces 150 and communication links 112. The application management server 120 communicates with other hosts 140 to transmit and receive application information that the application management server 120 and the hosts 140 are authorized to receive and transmit. The communication can be initiated either by the hosts 140 or by the application management server 120. The application information can be any information relating to one or more software or hardware applications, such as an installation package, source code, a script, a library file, a configuration/settings file, a database file, a template, and the like. The application information can be stored on the application management server 120 in a package repository 122, which is accessed upon request by the application management server 120. Alternatively, the package repository 122 may exist in a separate database (not shown) that the application management server 120 may access.

Application information can be distributed with any number of known methods. If, for example, an IT administrator intends to deploy a software update 134 via an installation package, then the IT administrator can initiate the deployment through the application management server 120 by copying, downloading, or building the software update 134 to the package repository 122, selecting the target hosts 140 to receive the software update 134, and then initiating a distribution of the software update 134 to the hosts 140 over the network 110. The application management server 120 then retrieves the software update 134 from the package repository 122 and transmits the software update 134 to the selected hosts 140 over the network 110. The selected hosts 140 receive the software update 134 from the network 110, and can install the software update 134. The foregoing example is only provided as a traditional example of how a deployment can be effected, and it should be understood that any other known method for deploying application information can be used.

The foregoing traditional example and other known methods, however, are vulnerable to tampering. Tampering includes any unauthorized access to a system, such as an attack by a non-authorized entity (i.e., the attacker 160) to reverse engineer, exploit, or develop countermeasures against the system. Tampering can result in unauthorized access to critical and protected information, silent modification to a system, disrupting system service, and/or numerous other undesired effects.

An attacker 160 can initiate an attack by gathering information about a target host. For example, the attacker 160 can use a sequential probe, Nmap port scan (either random or sequential), and the like, to gather software/hardware/network information of the target host. Based on the software/hardware/network information, the attacker 160 may find a weakness to exploit. The attacker 160 may then initiate any number of attacks such as integrity attacks, access attacks, availability attacks, confidentiality/authentication attacks, and the like in order to gain unauthorized access.

In the context of an application management system 100 where application information is exchanged with application servers 140 over the network 110, the application information can be especially sensitive. For example, the application management server 120 may be supplying a software update 134 to the hosts 140. A successful attacker 160 that intercepts the software update 134 may subsequently alter the installation package with malicious code and then retransmit the modified software update 136 over the network 110 to a host 140[1] while posing as the application management server 120. Because the hosts 140[1] "believes" it is receiving a software update 136 from the application management server 120, the hosts 140[1] may treat the software update 136 as an authorized installation, and subsequently install and execute the software update 136 that includes malicious code. This is one example of tampering.

Methods of anti-tampering include software-only anti-tamper solutions. Software-only anti-tamper solutions tend to focus on encrypting sensitive applications and data at rest. While encryption may make it more difficult for the network-connected attacker 160 to modify the contents of, for example, a software update 134 that is intended for host 140[1], the software-only solutions can have shortcomings.

First, the software-only anti-tamper solutions generally do not have a high level of security. Software-only solutions expose decryption keys in memory, as the keys are often resident in memory for a considerable amount of time. Accordingly, an attacker 160 who gains access to a host memory of a host with a decryption key may be permitted to potentially decrypt the application. Further, because the software-only solutions rely entirely on the operating system for their key storage and security, vulnerabilities in the operating system could allow for key exfiltration.

Second, the software-only anti-tamper solutions do not scale well for an enterprise rollout. In large and complex IT environments, the software-only solutions may rely heavily on encryption of critical application information, where the encryption mode may be incompatible with existing application management systems. The incompatibility can thus require each application management system, or worse, each application server, to be set up individually in a stovepipe fashion which can be time and cost inefficient.

Exemplary embodiments augment existing application management systems to facilitate enterprise rollouts of anti-tamper capabilities.

Figure 2:
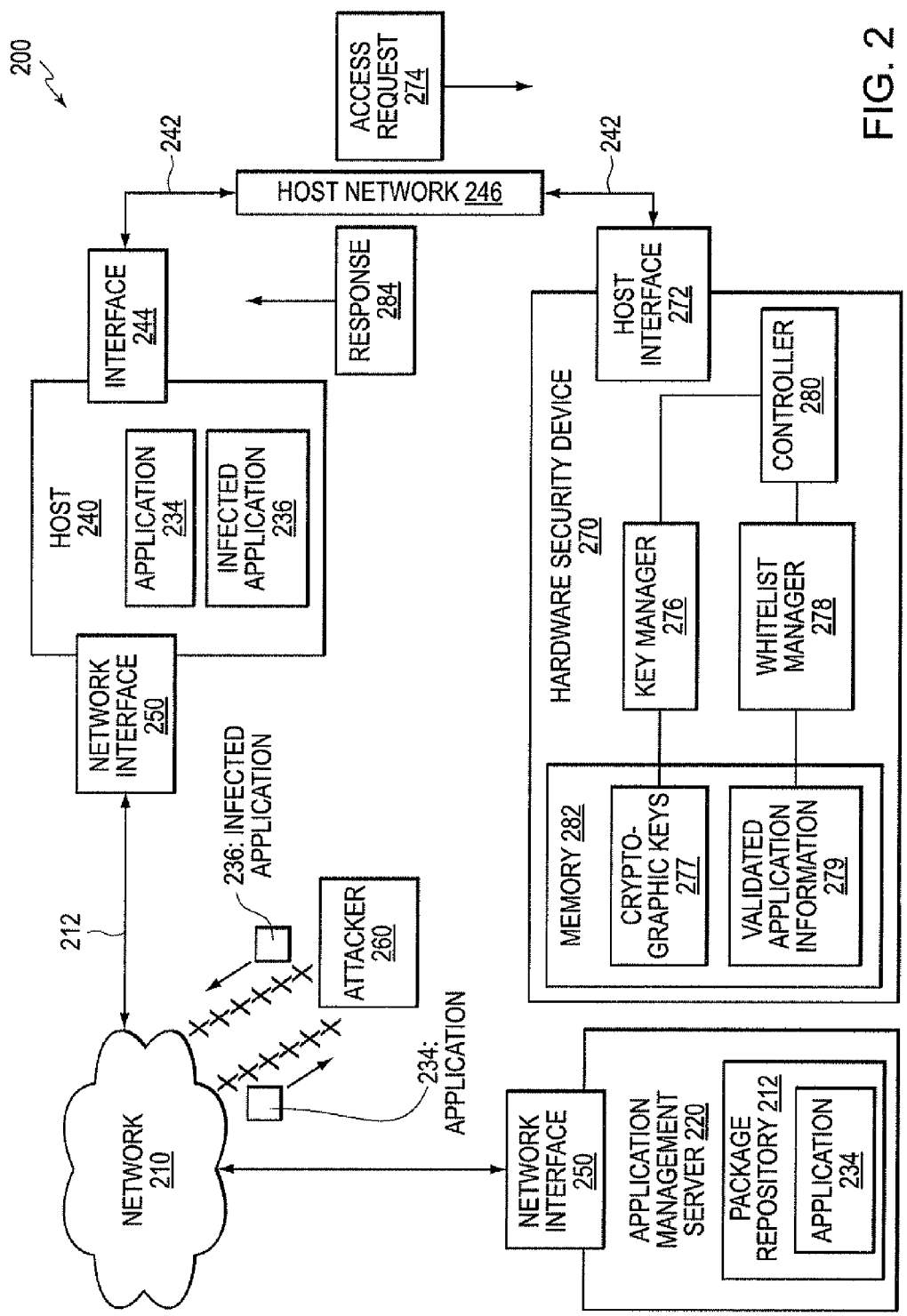
FIG. 2 shows a block diagram of an anti-tamper system including an anti-tamper hardware security device in an embodiment.

FIG. 2 shows a block diagram of an application management system 200 according to an exemplary embodiment. In this embodiment, an anti-tamper hardware security device 270 that can communicate with a host 240. The host 240 can be physically coupled to a network 210 via a communication link 212. The host 240 can communicate with an application management server 220 through the network 210 through at least one network interface 250. The application management server 220 can include a package repository 212 either directly on the application management server 220 or in a separate database (not shown) accessible by the application management server 220. Alternatively, the package repository 212 can at least partially exist on the host 240 or can be in a separate database (not shown) accessible by the host 240.

The host 240 can also include one or more host networks through which it can communicate with a plurality of devices. For example, a host network 246 can be of any of the following types: PCI/-X/e, ExpressCard, PC card, PCMCIA, USB, IEEE 1394, SCSI, e/SATA, IEEE 488, E/ISA, ATA, Micro-Channel, SMbus, and any other parallel or serial architectures that facilitate communication between the host 240 and physically-attached devices. The host network 246 can be physically located internally or externally to the host 240, and is preferably directed physically connected to the host 240 and/or one or more of the host's internal components via host communication links 242. The host 240 communicates through the host network 246 with an interface 244.

The host 240 communicates to an anti-tamper hardware security device 270 through the host network 246 via a host communication link 242. The anti-tamper hardware security device 270 can include a variety of components such as a host interface 272 configured to send and receive communications to and from the host 240, a whitelist manager 278 configured to store and retrieve application validation information 279, a key manager 276 configured to store and retrieve cryptographic keys 277 corresponding to application information, and a controller 280 configured to control the components of the anti-tamper hardware security device 270.

The host interface 272 of the anti-tamper hardware security device 270 is configured to send and receive communications to and from the host 240. The host interface 272 can be coupled to the host network 246 via the host communication link 242. The anti-tamper hardware security device 270 can directly physically connected to the host 240 through the host network 246 allowing for only the host 240 and the anti-tamper hardware security device 270 to access the host network 246. This can minimize the possibility of an attacker intercepting communications between the host 240 and the anti-tamper hardware security device 270. The host network 246 through which the anti-tamper hardware security device 270 communicates with the host 240 can be a PCIe bus, allowing for elevated authority through a hardware-isolated point-to-point topology, high data throughput, a relatively small physical footprint, and ease of installation.

The whitelist manager 278 can be configured to store and retrieve application validation information 279 corresponding to an application. Application validation information 279 is application information that has been validated to be acceptable for further processing such as installation, copying, and any other kind of use. For example, application validation information 279 can include a hash (e.g., MD5 checksum, SHA checksum, etc.) corresponding to a software update that can be used to verify the integrity of the software update.

The key manager 276 can be configured to store and retrieve cryptographic keys 277 corresponding to application information. The cryptographic keys 277 corresponding to application information can be decryption keys used for decrypting the application information. For example, the cryptographic keys 277 can include public or private symmetric or asymmetric decryption keys in any kind of cryptographic scheme (e.g., RSA, SHA-2, DES, AES, Blowfish, RC4, etc.) that is used by the application management system 200.

The application validation information 279 and cryptographic keys 277 can be stored in any repository or repositories internal or external to the anti-tamper hardware security device 270. For example, the validation application information 279 and cryptographic keys 277 can be stored in a separate database to which the anti-tamper hardware security device 270 has access. Preferably, the validation application information 279 and cryptographic keys 277 can be stored in a memory 282 coupled to the anti-tamper hardware security device 270 in order to maximize security through hardware isolation. Even more preferably, the memory 282 is a protected memory space accessible only by the anti-tamper hardware security device 270.

Even more preferably, the memory 282 can be pre-populated with application validation information 279 and cryptographic keys 277 in a secure environment. For example, the memory 282 can be pre-populated in an isolated environment that has not yet been connected to any network 210. For ease of deployment, the memory 282 can be a detachable memory (e.g., detachable flash memory card such as Secure Digital, Smart card, Memory stick, etc.) that is attachable directly to the anti-tamper hardware security device 270 or to the host 240, either of which have means for reading the attached memory. For additional security, the memory 282 may be a non-detachable memory.

The memory 282 may further be updated by the whitelist manager 278 and key manager 276 upon request from the application management server 220 or the host 240. For example, the repositories may need to be updated with validation application information 279 and cryptographic keys 277 corresponding to a new software update released after physical deployment of the anti-tamper hardware security device 270. For ease of deployment of updates, the update requests may be sent over the networks 210 (e.g., the update requests originate from the application management server 220) and/or 246 (e.g., the update requests originate from the host 240).

Figure 3:
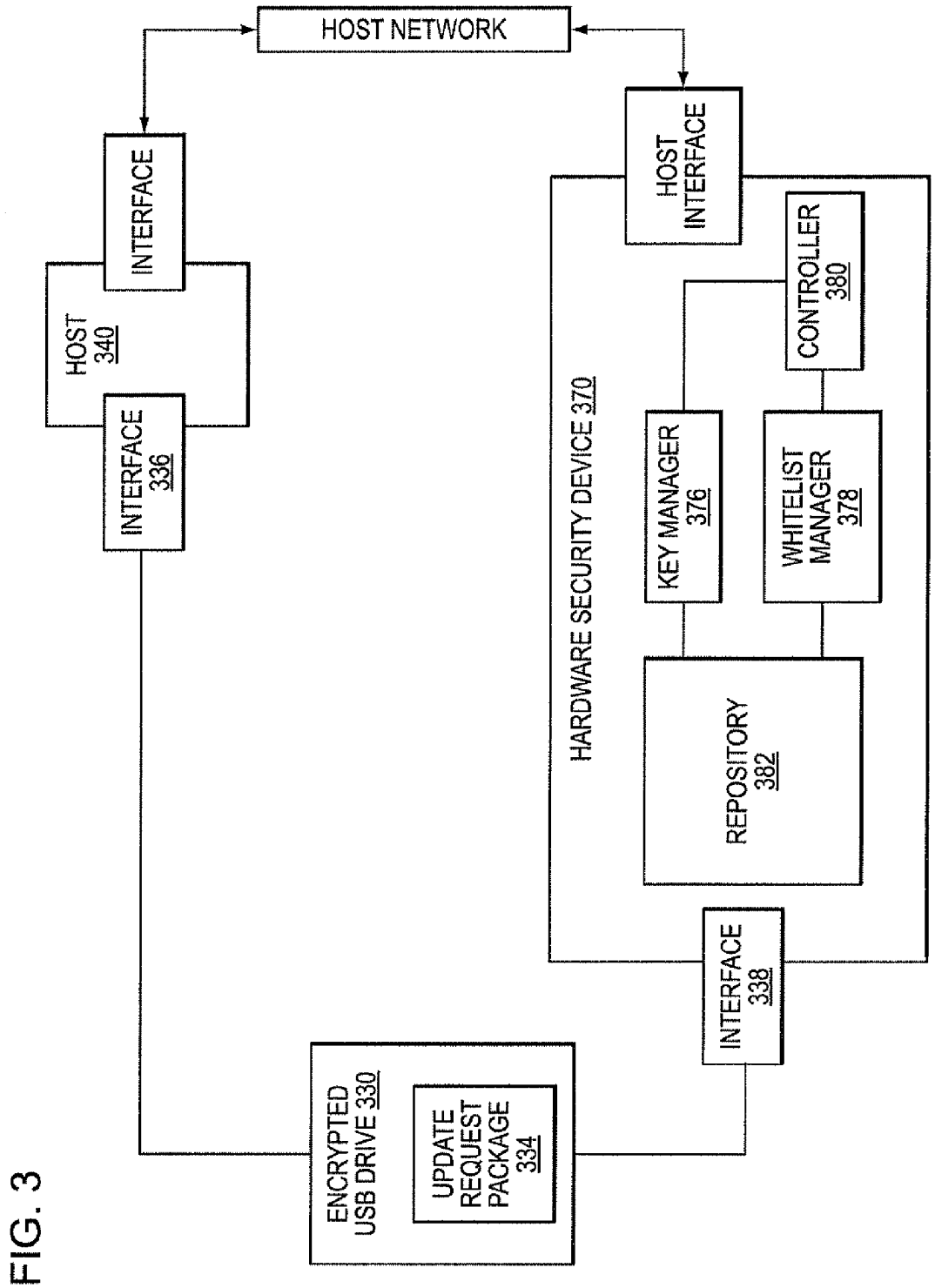
FIG. 3 shows a block diagram of an update system for an anti-tamper hardware security device in an embodiment.

As shown in FIG. 3, for additional security during the update process, the update requests may be distributed in secure, hardware-based update request packages. For example, an encrypted USB drive 330 may be populated with one or more update request packages 334 in a secure environment. The update request package can include application information corresponding to an application, for example, a generated hash, a decryption key, or a software update. The update request package can also include signed packages for additional security and/or management features. For example, in a public-key infrastructure (PKI), signed packages can support entity-key matching, central repository storage, and key revocation.

A host 340 and/or an anti-tamper hardware security device 370 each include an interface 336, 338 to communicate with the encrypted USB drive 330. The encrypted USB drive 330 may then be directly coupled to the host 340 with anti-tamper hardware security device 370 or directly coupled to each anti-tamper hardware security device 370 selected for the update. When the encrypted USB drive is directly coupled to the host 340 or the anti-tamper hardware security device 370, the host 340 and/or the anti-tamper hardware security device 370 recognizes the update request package 334 and the controller 380 subsequently proceeds to control a whitelist manager 378 and a key manager 376 to update the appropriate repository 382 with the update request package.

If, for example, the update request package 334 includes a generated hash and a decryption key, the whitelist manager 378 can update the repository 382 with the generated hash, and the key manager 376 can update the repository 382 with the decryption key. The whitelist manager 378 and key manager 376 can also associate the stored hash and decryption key with each other and/or with a particular application. The association can then be stored in the repository 382.

If, for example, the update request package 334 includes a software update or other application information, the whitelist manager 378 can generate a hash based on the software update or other application information, and the key manager 376 can generate a decryption key based on the software update or other application information. The whitelist manager 378 and key manager 376 can also associate the stored hash and decryption key with each other and/or with a particular application. The association can then be stored in the repository 382.

It should be understood that the secure, hardware-based update request packages are not limited to being populated onto an encrypted USB drive; they can be installed on Firewire devices, devices with Near Field radios or Wi-Fi or Bluetooth or infrared, or any other devices that can store data retrievable by a physical or wireless direct coupling to the host 340 and/or the anti-tamper hardware security device 370 through a secure, hardware-isolated link. Regardless of the media on which the update request packages are stored and through which they are transmitted, the host 340 and/or the anti-tamper hardware security device 370 have means through which to establish the direct coupling (e.g., USB ports, Firewire ports, wireless radios, etc.).

In FIG. 2, the communications between the host 240 and the anti-tamper hardware security device 270 over the host network 246 can include access requests 274 from the host 240, where each access request 274 is associated with a specific application. The access request 274 may originate from either the host 240 or the application management server 220. Regardless of where the access request 274 originates, in the first exemplary embodiment, the host 240 directly transmits the access request 274 to the anti-tamper hardware security device 270 via the host network 246. Direct transmission through the secure hardware-isolated host network 246 can provide additional security over a non-hardware-isolated host network.

The access request 274 can be a request by the host 240 to authorize access to deploy any kind of application information. In line with foregoing examples, the access request 274 can be a request by the host 240 to authorize installation of an application 234 stored in the package repository 212. The access request 274 may be associated with the application 234 that is preferably stored in an encrypted state that may not be used by the host 240 without decryption.

When the access request 274 is received by the host interface 272 of the anti-tamper hardware security device 270, the controller 280 of the anti-tamper hardware security device 270 receives and processes the access request 274 from the host interface 272. The anti-tamper hardware security device 270 may then perform any number of functions prior to generating a response 284 to the access request 274 to be sent back to the host 240.

The functions performed by the anti-tamper hardware security device 270 define various protection levels under which the anti-tamper hardware security device 270 can run depending on the level of security required by the application management system 200. The protection levels may be assigned at any granularity. For example, a global protection level may be assigned to the entire application management system 200, various protection levels may be assigned to each host 240, and/or various protection levels may be assigned for each application or file or package. Any granularity may be combined with or take priority over another. For example, a package may generally be assigned a protection level, but when installed on a host with a second protection level, either the package may override the host's protection level or the host may override the package's protection level depending on their priorities. The protection levels may also be assigned at various stages. For example, the protection levels may be predetermined upon deploying an entire application management system 200, upon deploying the host 240, upon deploying an application, upon the receipt of an access request 274 by an anti-tamper hardware security device 270, upon decryption of an application by an anti-tamper hardware security device 270, or at any other stage so as to fit the needs of security requirements.

Figure 4:
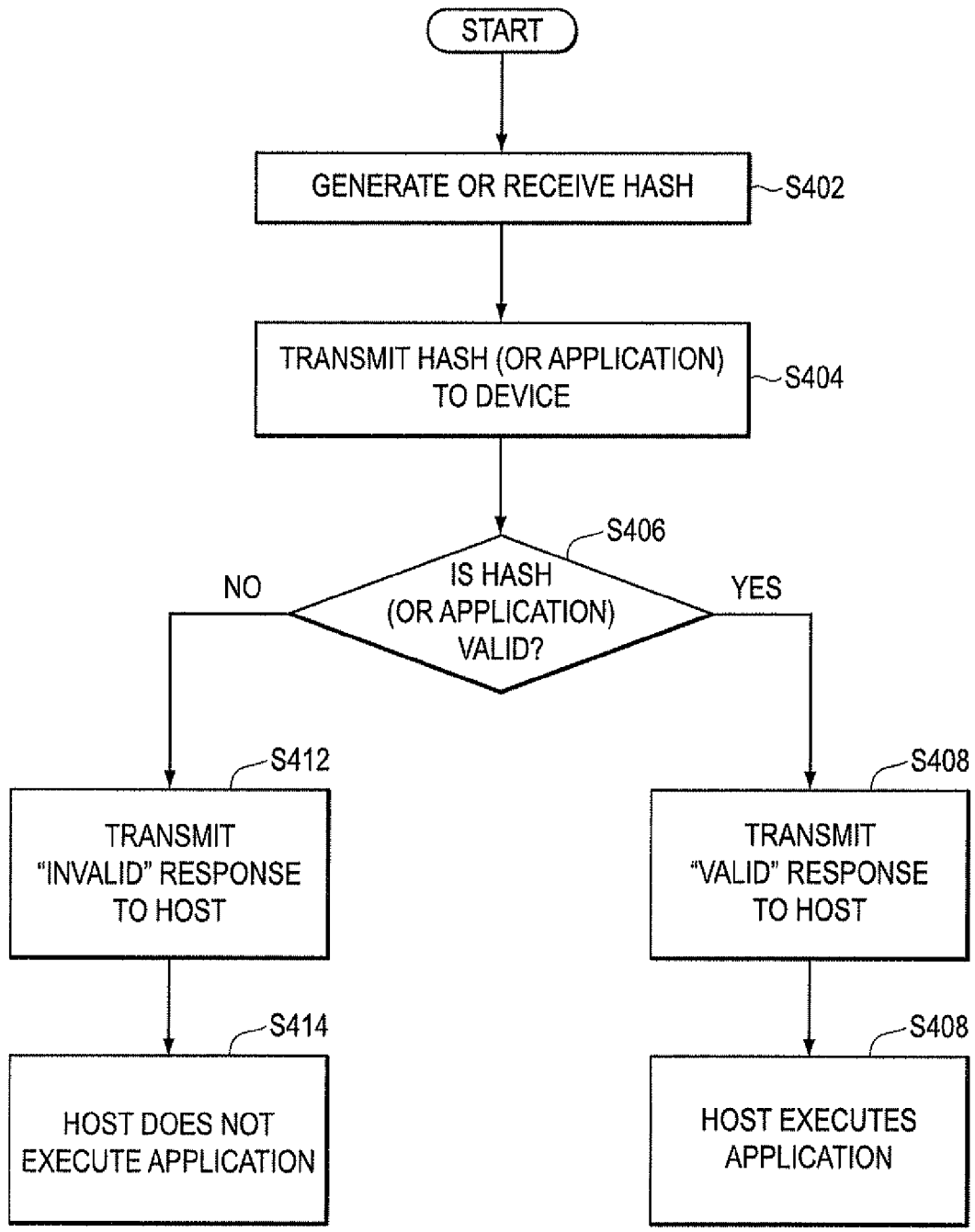
FIG. 4 shows a process of a first protection level in an embodiment.

In a process of a first protection level shown in FIG. 4, the controller 280 of the anti-tamper hardware security device 270 can validate the integrity of the application 234 using the application validation information 279 corresponding to the application 234.

In this protection level, the host 240 can generate a hash or receive a generated hash from the network 210 (Step 402). The host can then transmit a generated hash and the encrypted application 234 in the access request 274 to the anti-tamper hardware security device 270 (Step 404). Alternatively, the host can simply transmit the encrypted application 234 in the access request 274, after which the controller 280 would decrypt the application 234 and generate a hash. If an association between the application 234 and the corresponding application validation information 279 has been stored in the memory 282, then the whitelist manager 278 can quickly identify the application validation information 279 corresponding to the application 234. If the access request includes a hash based on the application 234 generated by the host 240, the controller 280 can quickly compare the hash generated by the host 240 with the stored hash. If the hashes match, then the controller 280 can conclude that the integrity of the application 234 has been validated and transmit a response 284 to the host 240 accordingly (Step 408). The host 240 may then execute the application 234 (Step 410).

If, however, an attacker 260 has manipulated the application 234 to generate and transmit an infected application 236, then the hashes may not match, and the controller 380 can conclude that the integrity of the infected application 236 has been compromised and transmit a response 284 to the host 240 accordingly (Step 412). The host 240, upon receiving a response from the anti-tamper hardware security device 270, may proceed to apply the validated application 234, but is configured not to apply the infected application 236 (Step 414). Because the anti-tamper hardware security device 270 is hardware-isolated and may only be accessible over the isolated host network 246 by the host 240, the attacker 260 cannot manipulate the application validation information 279 accessible only by the anti-tamper hardware security device 270, and thus the attacker 260 cannot deceive the host 240 into believing that the infected application 236 is valid.

In another aspect of the first protection level, the host 240 can transmit the entire application 234 in the access request 274. In this aspect, the anti-tamper hardware security device 270 would receive the access request 274 with the entire application 234 and the controller 280 can generate a hash based on the application 234. If the application 234 is valid, then the hash generated by the controller 280 will match a hash stored in the application validation information 279. If, however, the attacker 260 has modified the application 234 causing the host 240 to transmit the infected application 236 in the access request 274, then the hash generated by the controller 280 will not match a hash stored in the application validation information 279 and the controller 280 will notify the host 240 in the response 284 accordingly.

Figure 5:
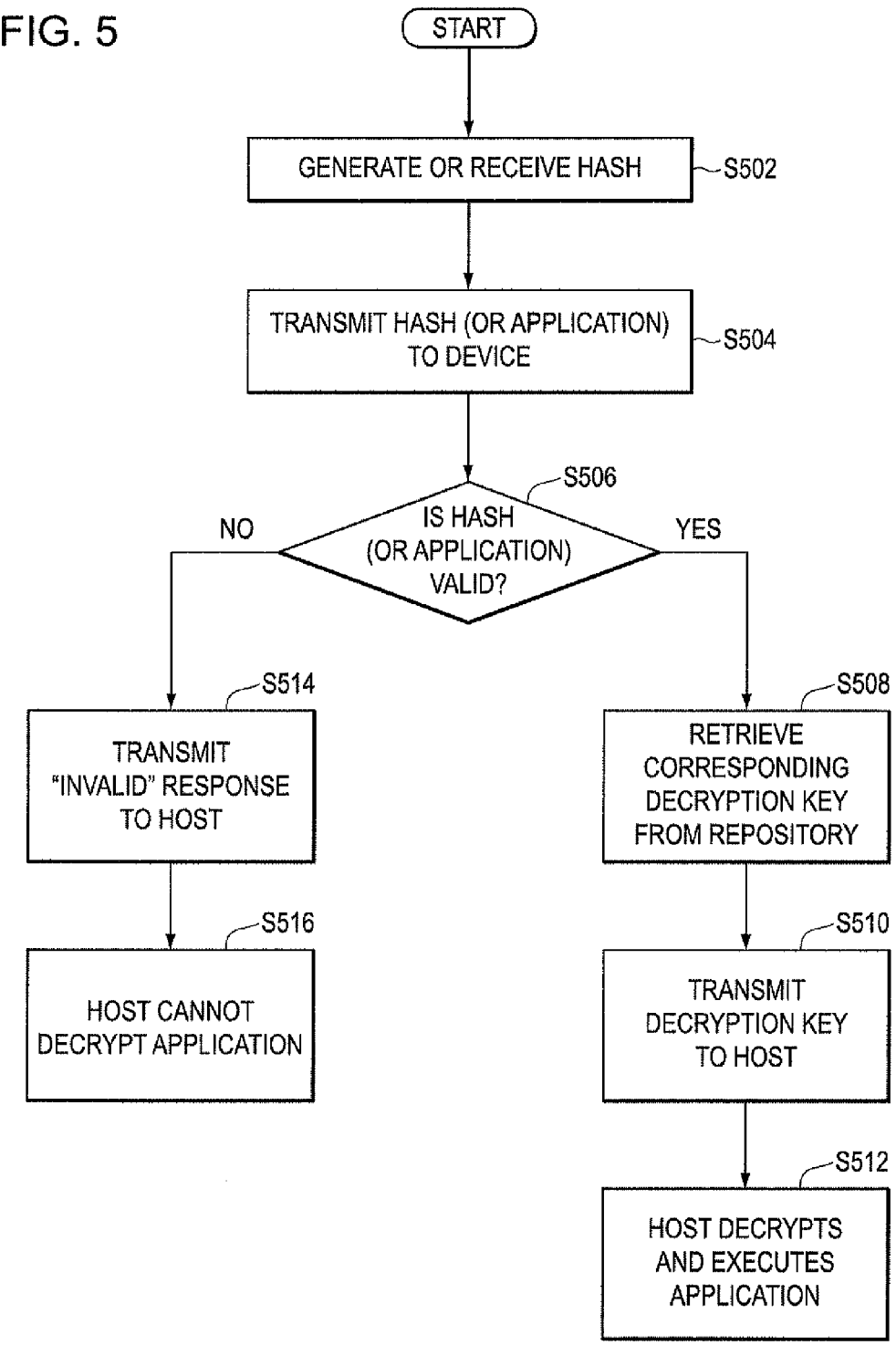
FIG. 5 shows a process of a second protection level in an embodiment.

In a process of a second protection level shown in FIG. 5, the controller 280 of the anti-tamper hardware security device 270 can validate the integrity of the application 234 using the application validation information 279 corresponding to the application 234 as described in the first protection level, and additionally transmit a decryption key corresponding to the application 234 in a response 284 to the host 240.

In this protection level, the host 240 can generate a hash or receive a generated hash from the network 210 (Step 502). The host 240 can then transmit a generated hash and the encrypted application 234 in the access request 274 to the anti-tamper hardware security device 270 (Step 504). Alternatively, the host can simply transmit the encrypted application 234 in the access request 274, after which the controller 280 would decrypt the application 234 and generate a hash. After receiving the access request 274 from the host interface 272, the controller 280 decides whether to retrieve and transmit the decryption key based at least on whether the application 234 is properly validated (Step 506). If the application 234 is properly validated, the controller 280 can cause the key manager 276 to retrieve the decryption key corresponding to the application 234 from the memory 282 (Step 508) and transmit the decryption key to the host 240 in the response 284 (Step 510). The host 240 may then be responsible for retaining the key and decrypting the application 234 on its own (Step 512) as well as erasing the key when it is no longer needed as security requirements permit.

If, however, an attacker 260 has manipulated the application 234 to generate and transmit an infected application 236 to the host 240, then the software update 236 is not properly validated by the controller 280. The controller 280 may choose not to allow the host 240 to expose the decryption key and/or application 234 in its memory by not transmitting the decryption key and instead transmitting a response 284 to the host 420 that the encrypted application 234 was not validated (Step 512). This prevents the host 240 from decrypting the encrypted application 234 (Step 514). Thus, the application 234 will remain encrypted and the attacker 260 will encounter greater difficulty in infecting the application 234 so as to cause the host 240 to expose the decryption key and/or decrypted application 234 in memory. Because the anti-tamper hardware security device 270 is hardware-isolated and may only be accessible over the isolated host network 246 by the host 240, the attacker 260 cannot manipulate the cryptographic keys 277 accessible only by the anti-tamper hardware security device 270, and thus the attacker 260 cannot deceive the host 240 into releasing the decryption key corresponding to the application 234.

The second protection level is generally more secure than the first protection level since the application 234 is encrypted, so the attacker 260 will encounter greater difficulty in manipulating the application 234 so as to deceive the host 240 into executing an infected application 236.

Figure 6:
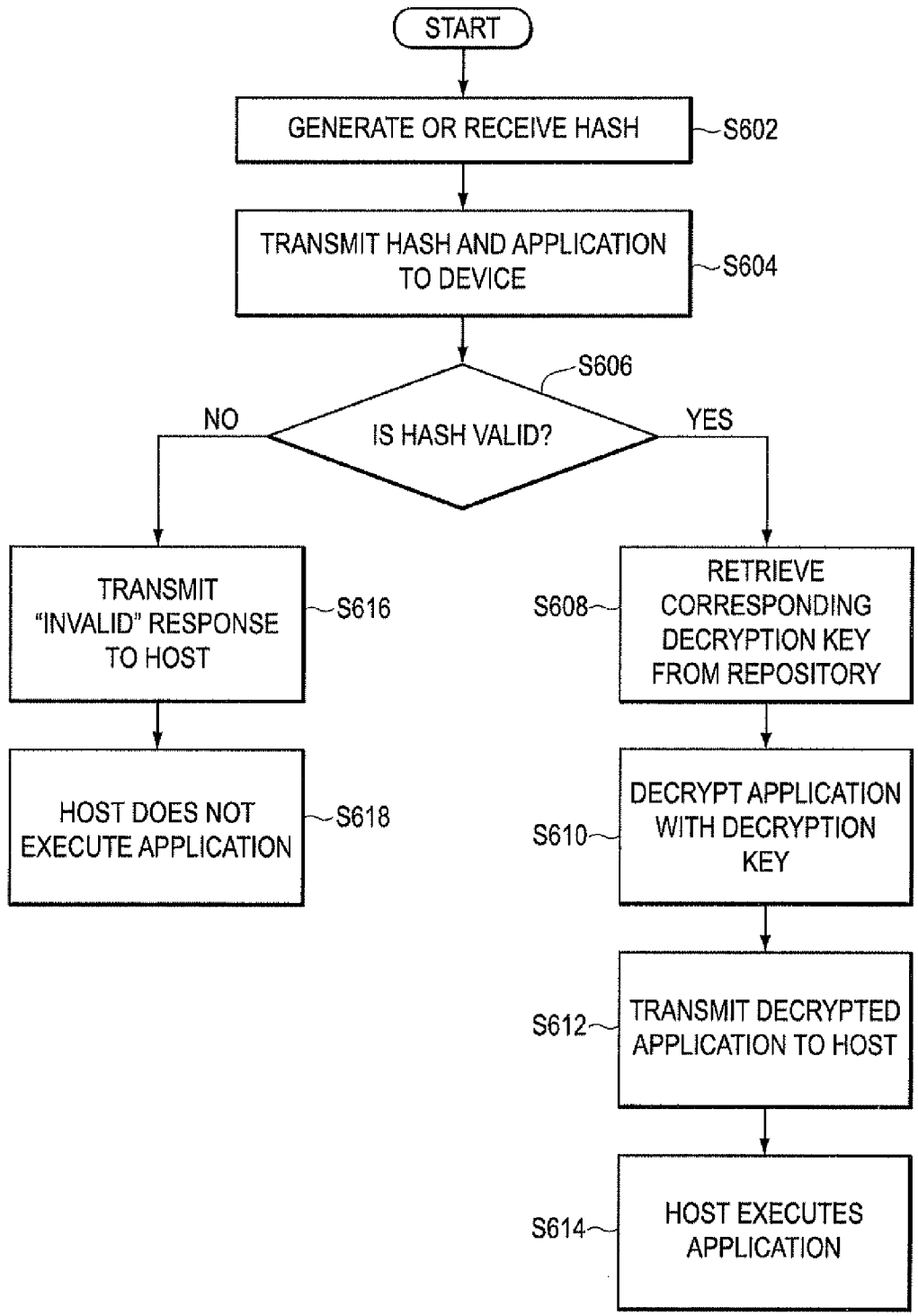
FIG. 6 shows a process of a third protection level in an embodiment.

In a process of a third protection level shown in FIG. 6, the controller 280 of the anti-tamper hardware security device 270 can validate the integrity of the application 234 using the application validation information 279 corresponding to the application 234 as described in the first and second protection levels, and additionally decrypt the application 234 before transmitting a response 284 to the host 240. The decryption key is thus withheld from the host 240.

In this protection level, the host 240 can generate a hash or receive a generated hash from the network 210 (Step 602). The host 240 can then transmit a generated hash and the encrypted application 234 in the access request 274 to the anti-tamper hardware security device 270 (Step 604). Alternatively, the host can simply transmit the encrypted application 234 in the access request 274, after which the controller 280 would decrypt the application 234 and generate a hash. After receiving the access request 274 from the host interface 272, the controller 280 validates the integrity of the application 234 (Step 606) as in the first and second protection levels and then decides whether to decrypt the application 234 based at least on whether the application 234 is properly validated. If the application 234 is properly validated, the controller 280 can control the key manager 276 to retrieve the decryption key corresponding to the application 234 (Step 608) and then decrypt the application 234 using the decryption key (Step 610). When the application 234 is decrypted, the controller 280 then transmits the decrypted application 234 to the host 240 (Step 612). The host 240 may then execute the decrypted application (Step 614). The host 240 may then be responsible for retaining the decrypted application 234 on its own as well as erasing the application 234 when it is no longer needed as security requirements permit.

If, however, an attacker 260 has manipulated the application 234 to generate and transmit an infected application 236 to the host 240, then the application 234 is not properly validated by the controller 280. The controller 280 may generate an appropriate response 284 notifying the host 240 of invalidity (Step 616). The controller 280 may choose not to allow the host 240 to expose the decrypted application 234 in its memory by not decrypting the application 234. In this case, the host cannot execute the encrypted application 234 (Step 618). Thus, the application 234 will remain encrypted and the attacker 260 will encounter greater difficulty in infecting the application 234 so as to cause the host 240 to expose the decrypted application 234 in memory. Because the anti-tamper hardware security device 270 is hardware-isolated and may only be accessible over the isolated host network 246 by the host 240, the attacker 260 cannot manipulate the cryptographic keys 277 accessible only by the anti-tamper hardware security device 270, and thus the attacker 260 cannot deceive the host 240 into releasing the decrypted application 234.

The third protection level is generally more secure than the second protection level since the decryption keys are withheld from the host 240, so that no decryption keys are exposed in the host's memory. However, the third protection level also requires additional processing resources on the anti-tamper hardware security device 270, since the anti-tamper hardware security device 270 must additionally decrypt the application 234 in isolation from the host 240 in order to allow the host 240 to install the validated application 234 without having to release the decryption key to the host 240.

Figure 7:
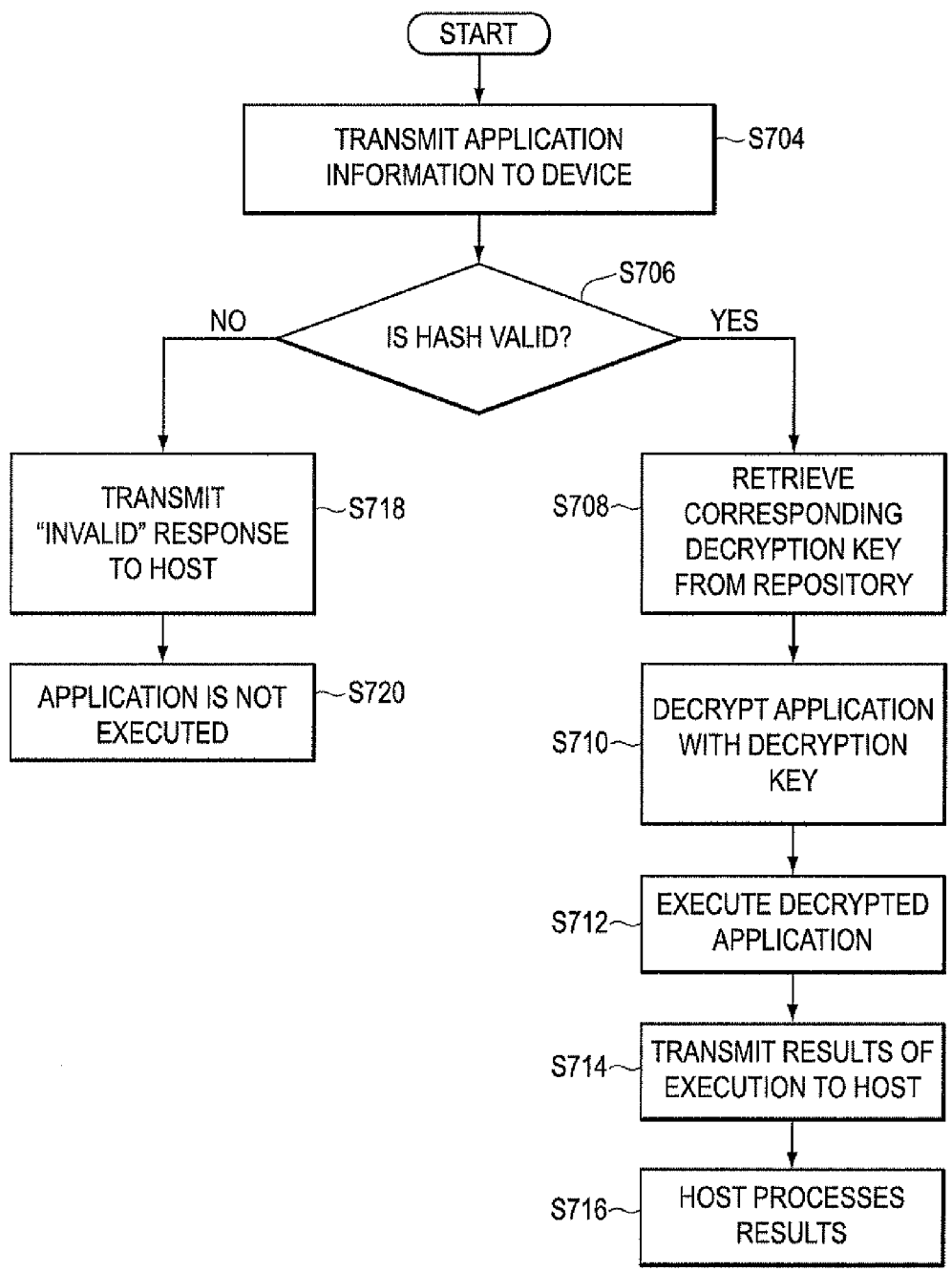
FIG. 7 shows a process of a fourth protection level in an embodiment.

In a process of a fourth protection level shown in FIG. 7, the controller 280 of the anti-tamper hardware security device 270 can validate the integrity of the application 234 using the application validation information 279 corresponding to the application 234 as described in the first, second, and third protection levels, and additionally decrypt the application 234 and directly execute the application 234, thus providing run-time protection. The decryption key and decrypted application 234 are thus withheld from the host 240.

In this protection level, the host 240 can generate a hash or receive a generated hash from the network 210. The host can then transmit a generated hash and the encrypted application 234 in the access request 274 (Step 704). (Alternatively, the host can simply transmit the encrypted application 234 in the access request 274, after which the controller 280 would decrypt the application 234 and generate a hash.) After receiving the access request 274 from the host interface 272, the controller 280 validates the integrity of the application 234 (Step 706) as in the first and second protection levels and then decides whether to decrypt the application 234 based at least on whether the application 234 is properly validated. If the application 234 is properly validated, the controller 280 can control the key manager 276 to retrieve the decryption key corresponding to the application 234 (Step 708) and then decrypt the application 234 using the decryption key (Step 710). When the application 234 is decrypted, the controller 280 then executes the decrypted application 234 (Step 712) and transmits the results of the execution to the host 240 in the response 284 (Step 714). The host 240 may then be responsible for processing and retaining the results on its own (Step 716) as well as erasing the results when they are no longer needed as security requirements permit.

If, however, an attacker 260 has manipulated the application 234 to generate and transmit an infected application 236 to the host 240, then the application 234 is not properly validated by the controller 280. The controller 280 may choose to transmit an appropriate response 284 to the host 240 (Step 718). Thus, the application 234 will remain encrypted to the host 240 and the attacker 260 will encounter greater difficulty in infecting the application 234 so as to cause the host 240 to expose the decrypted application 234 in memory (Step 720). Because the anti-tamper hardware security device 270 is hardware-isolated and may only be accessible over the isolated host network 246 by the host 240, the attacker 260 cannot manipulate the cryptographic keys 277 accessible only by the anti-tamper hardware security device 270, and thus the attacker 260 cannot deceive the host 240 into releasing the decrypted application 234.

The fourth protection level is generally more secure than the third protection level since the decrypted application 234 is withheld from the host 240, so that no decrypted application 234 is exposed in the host's memory. However, the fourth protection level also requires additional processing resources on the anti-tamper hardware security device 270, since the anti-tamper hardware security device 270 must additionally execute the application 234 in isolation from the host 240 in order to allow the host 240 to use the results of execution without having to release the decrypted application 234 to the host 240.

Figure 8:
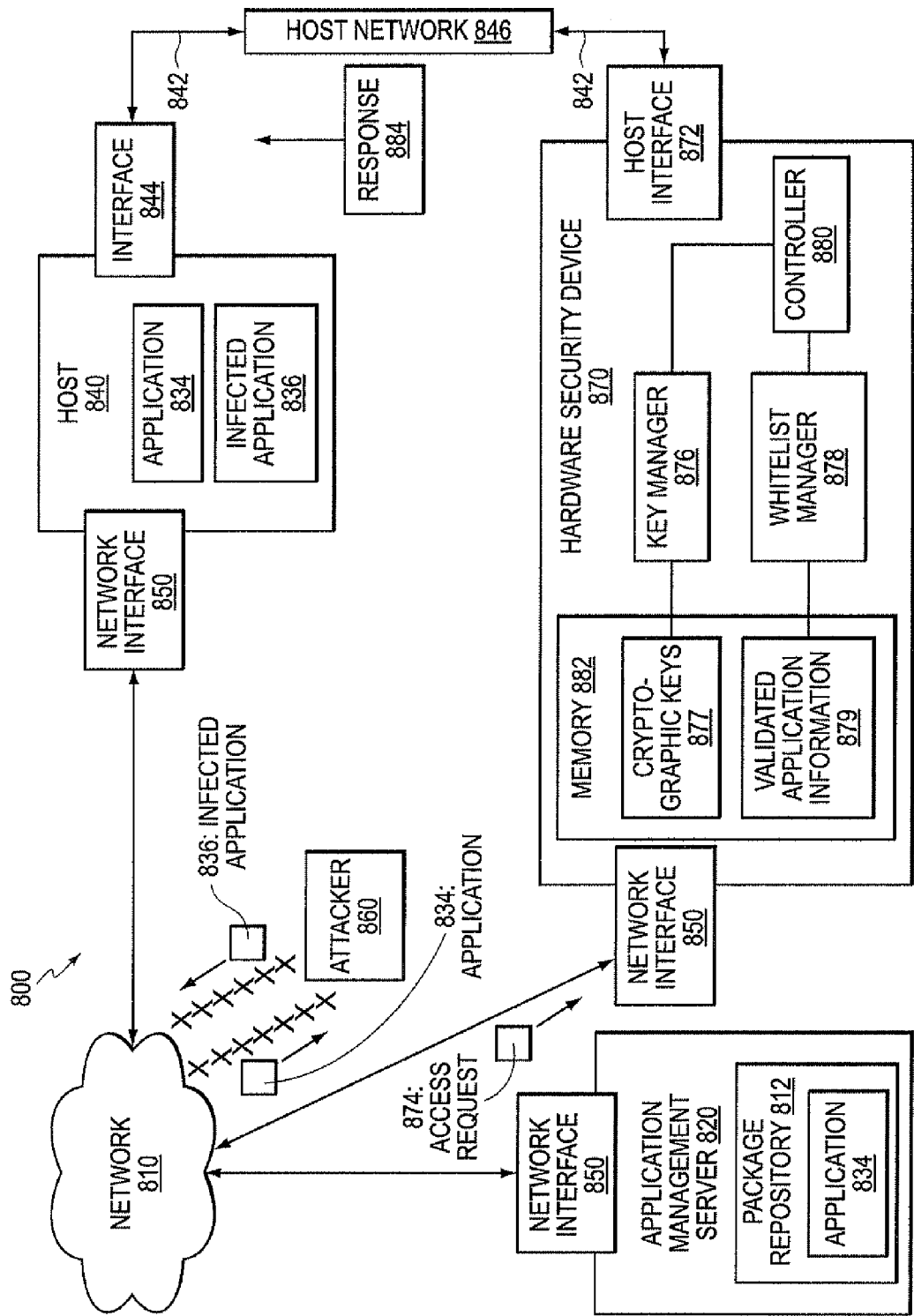
FIG. 8 shows a block diagram of an anti-tamper system including an anti-tamper hardware security device in an embodiment.

FIG. 8 shows a second exemplary embodiment, in which a host 840 communicates to an anti-tamper hardware security device 870 through a host network 846, and the anti-tamper hardware security device 870 further includes a network interface 850 through which it communicates to an application management server 820 through another network 810. The network 810 may be the same or different network over which the host 840 communicates with the application management server 820.

In this embodiment, the application management server 820 may transmit access requests 874 directly to the anti-tamper hardware security device 870, instead of the host 840 transmitting the access requests 874 or the application management server 820 transmitting the access requests 874 through the host 840. Direct communication between the application management server 820 and the anti-tamper hardware security device 870 offers several advantages over communication routed through the host. Direct communication allows for additional security if the host's security has been compromised. For example, a subverted host may be controlled to alter requests between the application management server 820 and the anti-tamper hardware security device 870 so as to lower protection levels or access protected information. However, in the direct communication architecture, the subverted host cannot intercept and alter the requests. Further, if the host is deemed to be have been compromised, applications running on the host may be remotely disabled since portions of the data they use are controlled by the anti-tamper hardware security device 870. As an additional feature, applications may be remotely disabled without even running the host, thus enabling security specialists to start and diagnose the host in a "safe mode". Further, direct communication allows automatic whitelist and/or key revocation and/or deployment without depending on the host to be running or routing requests.

Further, because the anti-tamper hardware security device 870 has direct access to the network 810, the application management server 820 can also populate cryptographic keys 877 and application validation information 879 accessed by the anti-tamper hardware security device 870. In a variation (not shown), the cryptographic keys 877 and application validation information 879 may be stored in a repository 812 rather than in the memory 882. Preferably, the anti-tamper hardware security device 870 communicates with the application management server 820 over a private, secured network that can be physically or cryptographically separated.

Figure 9:
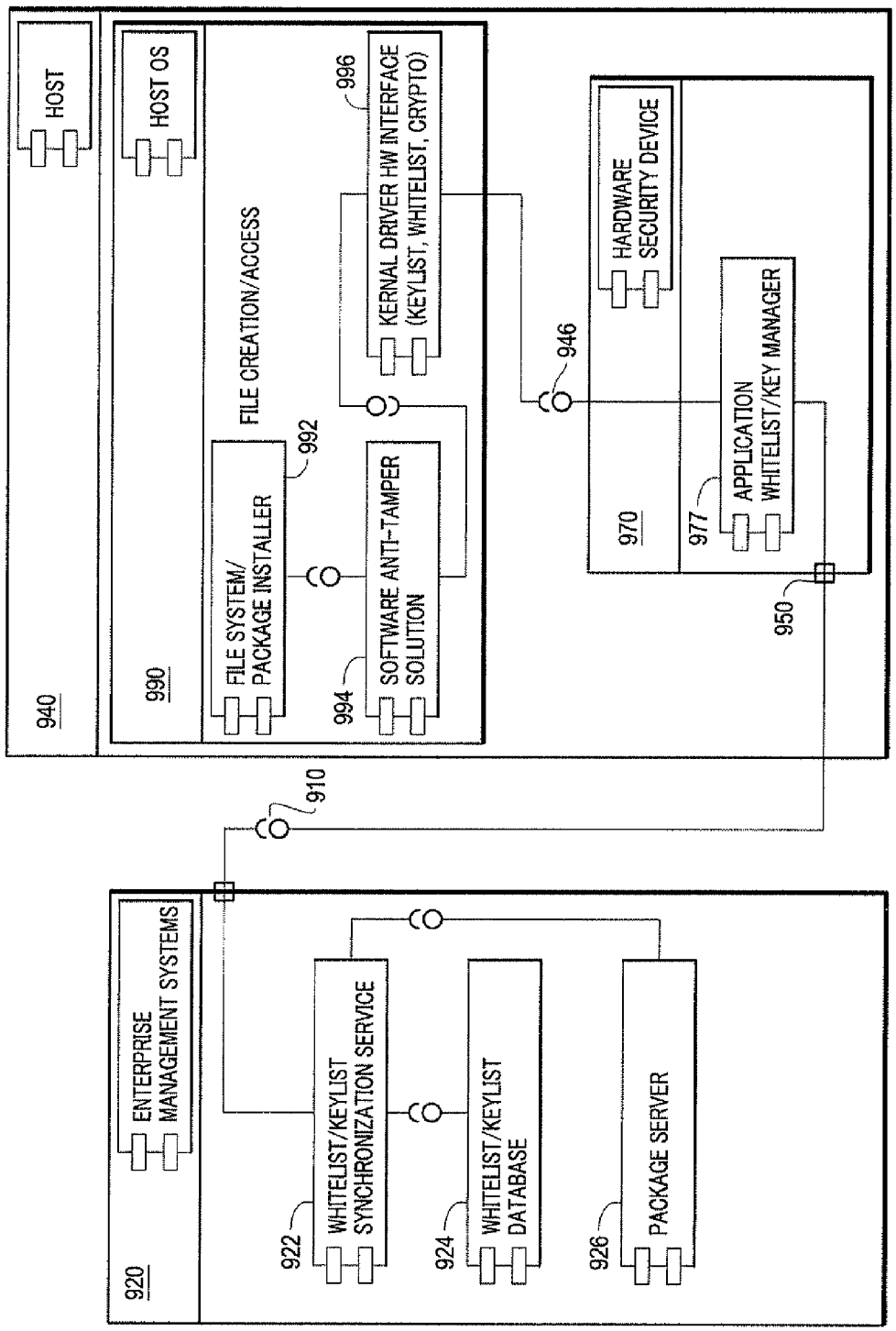
FIG. 9 shows a block diagram of an anti-tamper system including an anti-tamper hardware security device in an embodiment.

FIG. 9 shows a functional block diagram of a third exemplary embodiment in which the anti-tamper hardware security device 970 can be connected to an enterprise management system 920 through a private network 910 through a network interface 950. The private network 910 can be over a shared private network such as LAN, Wifi, token ring, VPN, or any other shared private network. Alternatively, though not shown, the private network can also be one requiring direct physical coupling with the application management server. For example, the private network can be of any of the following types: PCI/-X/e, ExpressCard, PC card, PCMCIA, USB, IEEE 1394, SCSI, e/SATA, IEEE 488, E/ISA, ATA, MicroChannel, SMbus, and any other parallel or serial architectures that facilitate communication between the application management server and the anti-tamper hardware security device. Having the private network 910 provides for further hardware isolation thus hardening the security of the communications between the enterprise management system 920 and the anti-tamper hardware security device 970.

The enterprise management system 920 includes a whitelist/keylist synchronization service 922, a whitelist/keylist database 924, and a package server 926.

The whitelist/keylist synchronization service 922 can synchronize whitelists and keylists between one or more anti-tamper hardware security devices. The whitelist/keylist synchronization service 922 can synchronize whitelists and keylists across the one or more anti-tamper hardware security devices, backup whitelists and keylists from one or more anti-tamper hardware security devices by storing the lists in the whitelist/keylist database 924, distribute whitelists and keylists to one or more anti-tamper hardware security devices, share whitelists and keylists to one or more anti-tamper hardware security devices, and/or delete whitelist and keylist entries from the whitelist/keylist database 924 or from the anti-tamper hardware security devices. The whitelist/keylist synchronization service 922 can also communicate with a package server 926 (for example, to update a whitelist and/or keylist based on new application installation packages pushed to the host 940) that can perform functions similar to the application management server 820 of FIG. 8. The whitelist/keylist synchronization service 922 communicates with the anti-tamper hardware security device 970 over a network 910.

The anti-tamper hardware security device 970 can include similar components (not shown) of the anti-tamper hardware security device 870 of FIG. 8 and can further include an integrated application whitelist/key manager 977. The application whitelist/key manager 977 is an integrated service that performs similar functions of at least the key manager 876, the whitelist manager 878, and the controller 880 of FIG. 8. The application whitelist/key manager 977 communicates with the whitelist/keylist synchronization service 922 through a network interface 950 over the network 910 to receive synchronized whitelist and/or keylist data. The application whitelist/key manager 977 communicates with the host 940 and specifically communicates with the host operating system 990 over a host network 946. The host network 946 can have similar functions to the host network 846 of FIG. 8.

The host 940 can be a single physical machine that includes a host operating system 990 that communicates with the anti-tamper hardware security device 970. Because the host 940 can be a single physical machine, the anti-tamper hardware security device 970 can be a device coupled to the host 940 so as to be considered part of the host 940. The host operating system 990 can include a file system/package installer 992, a software anti-tamper solution 994, and a kernel driver hardware interface 996.

The file system/package installer 992 is responsible for file creation and access as well as for installing and managing application installation packages. The file system/package installer 992 can receive new application installation packages from the package server 926. When the file system/package installer 992 initiates a request to install an application installation package, it forwards the request to the software anti-tamper solution 994.

The software anti-tamper solution 994 can be a pre-existing (i.e., before deployment of the anti-tamper hardware security device 970) solution. The software anti-tamper solution 994 can receive installation requests from the file system/package installer 992 and subsequently request whitelist validation of the application installation package of the anti-tamper hardware security device 970 through the kernel driver hardware interface 996.

The kernel driver hardware interface 996 forwards the validation request to the anti-tamper hardware security device 970. The application whitelist/key manager can validate the application installation package against the validation application information (not shown), create a new key for each file, cryptographically lock the application installation package's files from executing, and ship the application installation package back to the host 940 for later installation.

When the host 940 attempts to execute an application, the software anti-tamper solution 994 may request (through the kernel driver hardware interface) the application whitelist/key manager 977 to unlock the application for execution.

If the application is approved at the first protection level, the anti-tamper hardware security device 970 validates the file integrity for each file required by the application, and returns an authorization to the software anti-tamper solution 994 in the response.

If the application is approved at the second protection level, the anti-tamper hardware security device 970 validates the file integrity for each file required by the application, and returns an authorization and decryption key to the software anti-tamper solution 994 in the response. The software anti-tamper solution 994 can then decrypt the application's files with the decryption key.

If the application is approved at the third protection level, the anti-tamper hardware security device 970 validates the file integrity for each file required by the application, decrypts all files required by the application, and returns an authorization and the decrypted files to the software anti-tamper solution 994 in the response. The host operating system 990 can then execute the application with the decrypted files.

If the application is approved at the fourth protection level, the anti-tamper hardware security device 970 validates the file integrity for each file required by the application, decrypts all files required by the application, executes the application, and returns an authorization and execution results to the software anti-tamper solution 994 in the response. The host operating system 990 can then return the results to a requesting application or apply the results as needed.

With respect to the protection levels in any embodiment, the encryption/decryption and hashing algorithms can be user-defined at any protection level so as to integrate easily into existing security systems and frameworks. This provides flexibility with protection levels, for example, by providing unique keying material for the same file on different machines. Allowing the user to choose the encryption algorithm does not force them into adopting a predefined standard for their enterprise and provides a framework for updates to federal information processing standards (FIPS) and government regulations (SOX, HIPPA). The flexibility in levels allows a user to also define a per file protection profile for a machine ranging from unprotected file whitelisting (first protection level) to runtime anti-tamper protection provided by hardware isolation (fourth protection level) or any combinations of protection features in between.

The embodiments scale well to large enterprises with complex security requirements. The aforementioned flexibility also allows a system to meet all security requirements, thus allowing for fast provisioning and deployment while still maintaining a high level of performance. Hardware integration into the packaging process allows each file to be encrypted on an individual host with a unique key, but still allows packages to be scheduled and delivered from existing application management solutions.

Various modifications can be made to embodiments without departing from the spirit of the invention.

In one modification, the anti-tamper hardware security device does not have to determine whether to transmit a valid or invalid response to the host based only on the result of a hash comparison. Other factors can affect the determination. For example, if the host is in a suspect state (i.e., has been compromised, is in a vulnerable state lacking certain security patches, or is behaving abnormally), the anti-tamper hardware security device may choose to deliver only invalid responses to the host until the host is no longer in a suspect state. To determine the suspect state, the host may send various host system information to the anti-tamper hardware security device. Preferably, however, the anti-tamper hardware security device includes a variety of monitors that monitor the state of the host independent of the host's other functions. This provides additional flexibility in integrating into an enterprise system.

In another modification, the repository of application information is stored on the host, rather than on an application management server. Alternatively, the repository of application information may be stored in a separate database accessible by the host. In either case, it may not be necessary to have a physically separate application management server in the application management system.

In another modification, the cryptographic keys (including the encryption keys, decryption keys, or any combination of keys used in the cryptographic process) are centrally synchronized to a key synchronization server over a network. The key synchronization server may be an application management server. The keys can then be managed (i.e., generated, distributed, shared, deleted) from the key synchronization server. Central key management also serves as backup in case of data loss due to, for example, hardware malfunction or failure as well as allows for quick re-provisioning of security devices in those situations.

In another modification, the anti-tamper hardware security device may itself be a physically separate host with which one or more application servers communicate over, preferably, private networks.

The illustrated exemplary embodiments of the anti-tamper hardware security device, system, and methods as set forth above are intended to be illustrative and not limiting. Various changes may be made without departing from the spirit and scope of the invention.

What is claimed is:

1. An anti-tamper hardware security device that communicates with a host machine, comprising:
   circuitry configured as:
      a host interface coupled to the host machine and configured to receive an access request from the host machine, the access request being associated with an application to be deployed on the host machine and received by the host machine over a network coupled to the host machine at an interface;
      a key manager configured to manage cryptographic keys;
      a whitelist manager configured to manage application validation information;
      a controller configured to receive the access request from the host interface, validate the application using the application validation information, retrieve a cryptographic key associated with the application, and transmit a response to the host machine through the host interface if the controller determines that the application is valid; and
      a network interface coupled to the network and configured to receive application information related to the application,
      wherein the controller is further configured to decrypt the application using the cryptographic key associated with the application and execute the application after validating the application.

2. The anti-tamper hardware security device of claim 1, wherein
   the response includes at least one of an authorization message for the host machine to install the application and the cryptographic key associated with the application that enables the host machine to decrypt the application.

3. The anti-tamper hardware security device of claim 1, wherein
   the response includes at least one of an authorization message for the host machine to install the application, the cryptographic key associated with the application that enables the host machine to decrypt the application, and a validated application executable on the host machine.

4. The anti-tamper hardware security device of claim 1, further comprising:
   a memory configured to store cryptographic keys and application validation information.

5. The anti-tamper hardware security device of claim 4, wherein
   the response includes at least one of an authorization message for the host machine to install the application, the cryptographic key associated with the application that enables the host machine to decrypt the application, a validated application executable on the host machine, and a result of an execution of the application by the controller in the memory.

6. The anti-tamper hardware security device of claim 1, wherein
   the application validation information includes validated hash information corresponding to a valid application.

7. The anti-tamper hardware security device of claim 6, wherein
the validated hash information is generated by the whitelist manager.

8. The anti-tamper hardware security device of claim 1, wherein
the cryptographic keys are unique to the host machine, such that the cryptographic keys can only be used to decrypt applications for installation on the host machine.

9. The anti-tamper hardware security device of claim 1, wherein the network interface is further configured to receive an access request associated with the host machine and the application from the network, and the controller is further configured to receive the access request associated with the host machine and the application from the network interface.

10. The anti-tamper hardware security device of claim 1, wherein
the device is configured to physically couple directly to the host machine.

11. The anti-tamper hardware security device of claim 1, wherein the access request includes the application.

12. An anti-tamper system comprising:
the anti-tamper hardware security device of claim 1; and
an application management server configured to manage the application and communicate with the host machine.

13. The anti-tamper system comprising:
the anti-tamper hardware security device of claim 1; and
an application management server configured to manage the application and communicate with the anti-tamper hardware security device.

14. The anti-tamper system of claim 12, wherein
the application management server stores synchronized copies of the cryptographic key, the application validation information, and the application.

15. A method of securing an application management system comprising:
receiving access requests from a host machine, the access request being associated with an application to be deployed on the host machine and received by the host machine over a network coupled to the host machine at a first interface;
validating the application using application validation information;
decrypting the application with a cryptographic key;
executing the application after validating the application;
transmitting a response to the host machine; and
receiving application information from the network at a second interface, wherein
the response includes at least one of an authorization message for the host machine to install the application, the cryptographic key associated with the application that enables the host machine to decrypt the application, a validated application executable on the host machine, and a result of an execution of the application by the controller in a memory.

16. The method of claim 15, wherein the access request includes the application.

17. A non-transitory computer-readable storage medium storing a program executable by a hardware processor comprising:
a first reception unit configured to receive access requests from a host machine, the access request being associated with an application to be deployed on the host machine and received by the host machine over a network coupled to the host machine at an interface;
a validation unit configured to validate the application using application validation information;
a decryption unit configured to decrypt the application with a cryptographic key;
a memory configured to execute the application after validating the application;
a transmission unit configured to transmit a response to the host machine; and
a second reception unit coupled to the network and configured to receive application information, wherein
the response includes at least one of an authorization message for the host machine to install the application, the cryptographic key associated with the application that enables the host machine to decrypt the application, a validated application executable on the host machine, and a result of an execution of the application by the controller in a memory.

18. The non-transitory computer-readable storage medium of claim 17, wherein the access request includes the application.

* * * * *